(12) United States Patent
Tertel et al.

(10) Patent No.: US 9,471,046 B2
(45) Date of Patent: Oct. 18, 2016

(54) METHOD FOR PRODUCING A PART (71) Applicant: AIRBUS OPERATIONS GMBH, Hamburg (DE)

(72) Inventors: Stephan Tertel, Hamburg (DE); Markus Longeru, Hamburg (DE); Patrick Steinmueller, Stade (DE); Dirk Elbracht, Buxtehude (DE); Chris Degen, Bliedersdorf (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 453 days.

(21) Appl. No.: 13/947,475

(22) Filed: Jul. 22, 2013

(65) Prior Publication Data
US 2014/0025193 A1 Jan. 23, 2014

Related U.S. Application Data (63) Continuation of application No. PCT/EP2012/051077, filed on Jan. 25, 2012.

(60) Provisional application No. 61/437,393, filed on Jan. 28, 2011.

(30) Foreign Application Priority Data

Jan. 28, 2011 (DE) ........................ 10 2011 003 314

(51) Int. Cl.
*G05B 13/04* (2006.01)
*B29C 33/38* (2006.01)
(Continued)

(52) U.S. Cl.
CPC ........... *G05B 13/04* (2013.01); *B29C 33/3835* (2013.01); *B29C 70/54* (2013.01);
(Continued)

(58) Field of Classification Search
CPC ....... G06T 17/00; G06T 19/00; G06F 17/50; G06F 17/5009; G06F 17/5095; G06F 2217/38; G06F 2217/41; G06F 2217/42; G06F 2217/80; B29C 33/38; B29C 33/3835; B29C 67/92; G05B 13/04
USPC ......................................................... 700/118
See application file for complete search history.

(56) References Cited

U.S. PATENT DOCUMENTS 5,932,055 A * 8/1999 Newell ................. B22F 1/0003
156/245
6,261,506 B1 * 7/2001 Nguyen .............. B29C 67/0062
264/308

(Continued)

FOREIGN PATENT DOCUMENTS

DE WO 2012101140 A1 * 8/2012 ............. B29C 70/54

OTHER PUBLICATIONS

Yap, et al., The analysis of skin-to-stiffener debonding in composite aerospace structures. Composite Structures vol. 57, No. 1-4, Jul. 1, 2002, p. 425-435.

(Continued)

*Primary Examiner* — Crystal J Barnes-Bullock
(74) *Attorney, Agent, or Firm* — Lorenz & Kopf, LLP (57) ABSTRACT

A method for producing a part is provided, the method including the following: a first step of a computer-aided simulation for a plurality of cross-sections of the part based on a 3D cross-sectional model and obtaining a first result, which represents shrinkage of the part basically caused by thermal and/or chemical reactions; a second step of a further computer-aided simulation for the plurality of cross-sections of the part based on a 2D shell model and obtaining a second result, which represents shrinkage of the part basically caused by thermal and/or chemical reactions; determining a scale factor for the second result in such a way that the second result corresponds to the first result; determining scale factors for any cross-sections which are between two adjacent cross-sections from the plurality of cross-sections, by interpolation; predicting a distortion of the part; and producing the part based on the predicted distortion of the part.

2 Claims, 5 Drawing Sheets (51) Int. Cl.
  *G06Q 50/04* (2012.01)
  *B29C 70/54* (2006.01)
  *G06F 17/50* (2006.01)

(52) U.S. Cl.
  CPC ....... *G06F17/5009* (2013.01); *G06F 17/5095* (2013.01); *G06Q 50/04* (2013.01); *G06F 2217/41* (2013.01); *G06F 2217/80* (2013.01)

(56) References Cited

U.S. PATENT DOCUMENTS

| | | | | |
|---|---|---|---|---|
| 6,813,533 | B1* | 11/2004 | Semak | B23K 26/34 148/97 |
| 7,024,342 | B1* | 4/2006 | Waite | B22D 17/32 700/118 |
| 7,100,246 | B1* | 9/2006 | Perrotto | D01G 1/08 19/0.35 |
| 7,881,818 | B2* | 2/2011 | Van Bael | G06F 17/50 229/89 |
| 7,979,257 | B2* | 7/2011 | Yu | B29C 45/7693 703/9 |
| 8,625,883 | B2* | 1/2014 | Marre | G06T 7/0022 382/154 |
| 9,159,106 | B1* | 10/2015 | Bodell | G06Q 10/06 |
| 9,206,309 | B2* | 12/2015 | Appleby | B22C 9/04 |
| 2006/0074614 | A1* | 4/2006 | Chang | B29C 33/3835 703/6 |
| 2008/0273777 | A1* | 11/2008 | Luboz | G06T 7/0081 382/130 |
| 2011/0189440 | A1* | 8/2011 | Appleby | B29C 33/3835 428/156 |

OTHER PUBLICATIONS

Fernlund, et al., Finite element based prediction of process-induced deformation of autoclaved composite structures using 2D process analysis and 3D structural analysis. Composite Structures vol. 62, No. 2, Nov. 1, 2003, p. 223-234.

Dong, et al., A Parametric Study on the Process-Induced Deformation of Composite T-Stiffener Structures. Composites Part A: Applied Science and Manufacturing, vol. 41, No. 4, Apr. 1, 2010, p. 515-520.

International Searching Authority, International Search Report dated Jun. 12, 2012 for International Application No. PCT/EP2012/051077.

International Searching Authority, Written Opinion dated Jun. 12, 2012 for International Application No. PCT/EP2012/051077.

German Patent and Trademark Office, German Office Action dated Jan. 5, 2012 for German Patent Application No. 102011003314.9.

* cited by examiner

METHOD FOR PRODUCING A PART

CROSS-REFERENCES TO RELATED APPLICATIONS

This is a continuation of International Application No. PCT/EP2012/051077, filed Jan. 25, 2012, which application claims priority to U.S. Provisional Application No. 61/437,393, filed on Jan. 28, 2011, and to German Patent Application No. 10 2011 003 314.9, filed on Jan. 28, 2011, which are each incorporated herein by reference in their entirety.

TECHNICAL FIELD

The technical field relates to a method for producing a part, in particular a part having reinforcing elements, for an aircraft or spacecraft.

BACKGROUND

Parts and structures for aircraft and spacecraft are of increasingly large size, and in certain instances, parts and structures of this type are being produced monolithically out of carbon fibre reinforced plastics material (CFRP). Current commercial aircraft comprising wings having a wingspan much greater than 30 meters serve as an example. The wings comprise wing shells which are of a correspondingly large size. The shells are reinforced in a known manner using reinforcing elements, so-called stringers, the above-mentioned CFRP material generally serving as a material for the shells and the reinforcing elements. The shell and reinforcing elements will be referred to in the following in short as components and the assembly itself as a part.

The assembly of the shell and reinforcing elements is often produced in a monolithic manner, either the complete part, that is to say the shell having reinforcing elements arranged thereon, being cured in a curing process in an autoclave, or the shell being initially cured in an autoclave, then the reinforcing elements being fixed to the shell, and then this assembly of cured shell and uncured reinforcing elements being cured in an autoclave in a further curing process. It is however also conceivable that the reinforcing elements are initially cured, then the reinforcing elements are fixed to the uncured shell, and then this assembly is cured together in a curing process.

In any case, the part and components are subjected to a change in their physical properties by the curing, during which heat is released due to a chemical reaction, that is to say that the part and components change, for example in length and orientation, and as a result undesirable warpings, or component distortion, may occur in the end product, that is to say the part, which warpings are for example physically described as moments and distortion angles. A major reason for the occurrence of component distortion is the thermal expansion behaviour of the materials, in particular of the resin used, which is indicated by coefficients of thermal expansion.

In the prior art, methods exist by which a curing process can be simulated on a computer in such a way that changes to physical properties of this type owing to the curing process can be predicted. Simulation methods of this type are, for example, the CHILE method (CHILE=Curing Hardening Instantaneously Elastic Formulation), the VE method (VE=Visco Elastic) or the PVE method (PVE=Pseudo Visco Elastic). In these methods, the part and its components are divided into three-dimensional (3D) elements having known parameters, and these 3D elements are then subjected to the simulation method, in order to thereby predict the distortion of the part. Owing to the result of the prediction of the distortion of the part, changes in the production method are then carried out in order to thereby arrive accordingly at a part end product having desired physical properties.

The above-described conventional methods deliver relatively good prediction results, as long as only relatively small parts or relatively small portions of parts in the order of a few millimeters are considered. Conventional simulation methods cannot model larger parts, such as the above-mentioned wing shells having a dimension of over 30 meters, in a sufficiently detailed manner owing to a lack of storage capacity, for which there would be an extremely great need. As a result, production of relatively large parts according to the conventional method is considered to be disadvantageous, as a prediction of the distortion of the part is relatively inaccurate, and thus the production of a part having predetermined desired properties is relatively difficult.

In addition, other objects, desirable features and characteristics will become apparent from the subsequent summary and detailed description, and the appended claims, taken in conjunction with the accompanying drawings and this background.

SUMMARY

According to various exemplary embodiments of the present disclosure, provided is an improved method for producing a part, in particular a part for an aircraft or spacecraft, which eliminates the aforementioned disadvantages.

Accordingly, a method for producing a part is provided, in particular a part for an aircraft or spacecraft, which allows a relatively accurate prediction of a distortion of the part, the knowledge about the potential distortion of the part being incorporated into the production of the part, in such a way that in the end the part has properties which are predetermined, that is to say desired.

A part, in particular for an aircraft or spacecraft, is also provided, the part basically comprising a shell and at least an element reinforcing the shell, that is to say a reinforcing element, and the part being produced by the method according to the various teachings of the present disclosure.

The idea on which the present disclosure is based comprises in carrying out, in a first step, a computer-aided simulation for a plurality of cross-sections of the part based on a 3D cross-sectional model and obtaining a first result therefrom, which represents shrinkage of the part basically caused by thermal and/or chemical reactions; carrying out, in a second step, a further computer-aided simulation for the plurality of cross-sections of the part based on a 2D shell model and obtaining a second result therefrom, which represents shrinkage of the part basically caused by thermal and/or chemical reactions; then determining a scale factor for the second result in such a way that the second result corresponds to the first result; then determining scale factors for any cross-sections which are between two adjacent cross-sections from the plurality of cross-sections, and specifically by interpolation; then predicting a distortion of the part on the basis of the previous steps; and then producing the part based on the predicted distortion of the part. In this case, it is advantageous that compared to approaches which have already been described, a limitation in the production and the prediction of the distortion of the part to relatively small parts or part portions is not necessary, in such a way that relatively large parts can also be simulated with relatively good accuracy and produced based on this simulation.

According to one exemplary embodiment, the second step is carried out for a predetermined temperature of the part and in one example, also for a predetermined unit moment which acts on the part. The first case is known as the temperature load case, and the second case is known as the moment load case. In one embodiment, the step of determining the scale factor is carried out based on a sum of the temperature load case and the moment load case, from which the advantage emerges that determining the expected distortion of the part and production of the part based thereon can be carried out with even greater accuracy.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
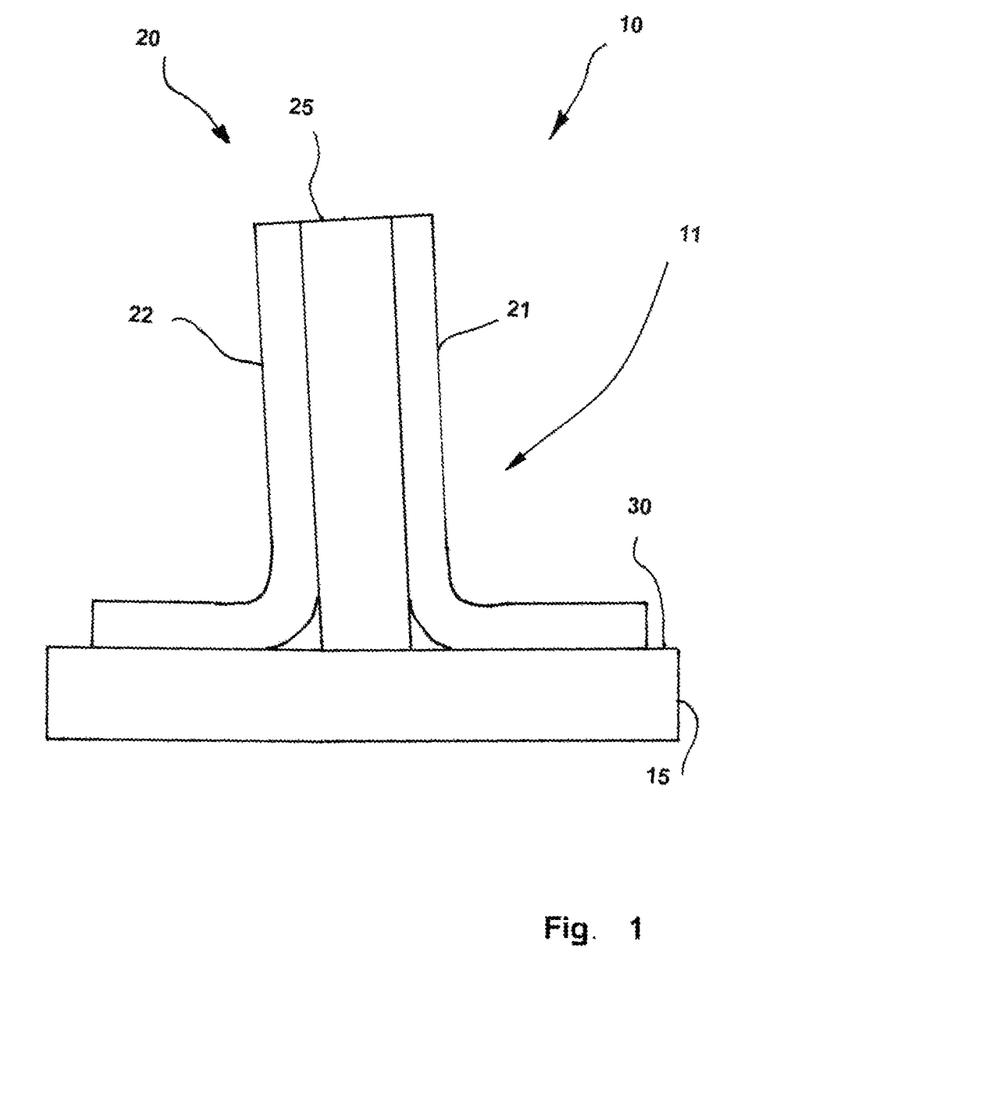
FIG. 1 is a cross-sectional view of one exemplary embodiment of a part.

FIG. 1 shows a cross-section 11 of a detail of a part 10 which comprises a shell 15 and a first reinforcing element 20 and a second reinforcing element 25. In this case the longitudinal direction of the part 10 extends perpendicular to the plane of projection, the length of the part 10 being up to several meters. In the example depicted, the shell 15 is part of a wing shell of an aircraft. The first element 20 (so-called stringer), which reinforces the shell 15 and is shown in FIG. 1 by two angle brackets 21, 22, is mounted on the surface 30 of the shell 15, which consists of fibre-reinforced material. A strip blank (so-called blade) 25 is arranged between the angle brackets 21, 22 as a further element additionally reinforcing the shell 15. The material of the stringer and blade is also fibre-reinforced plastics material.

When producing the part 10, the shell 15 is initially cured completely in an autoclave in a first step. Subsequently, in a second step, the stringer 20 and/or blade 25 are connected to the shell 15, and then in a third step the assembly of the shell 15, stringer 20 and/or blade 25 is cured in turn in an autoclave, in such a way that the part 10 is produced.

It is however also conceivable that a cured shell is connected to a cured stringer. The material thickness of the shell, stringer and/or blade can also vary.

Figure 2:
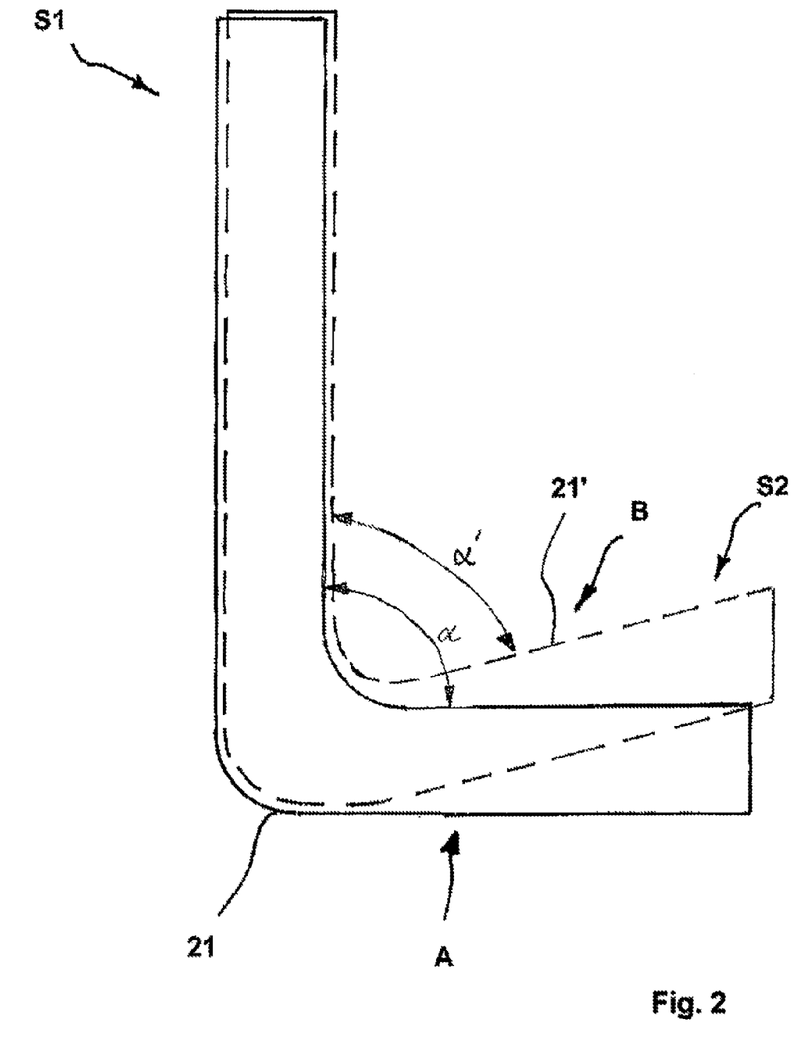
FIG. 2 is a cross-sectional view of one exemplary embodiment of a reinforcing element in the normal state and with material distortion caused by heat.

As already mentioned above, the part 10 or the shell 15, stinger 20 and blade 25 components which together form the part 10 are subject to a material distortion during the respective curing process, which distortion can manifest itself in a change in the length and/or orientation of the respective components, as shown, for example, in FIG. 2. In this case, the profile 21 of the stinger 20 shown in FIG. 1 is shown in a state before curing (state A) and after curing (state B), an angle α between arms S1, S2 of the profile 21 becoming a smaller angle α' of the resulting profile 21' at the end of the production process as a result of cooling and chemical shrinkage (so-called "spring in" effect).

Before producing the part, one or more cross-sectional areas of the stringer and/or blade is/are initially modelled using a cross-sectional model, that is to say described mathematically according to a finite element model for behaviour caused by heat load, to determine a distortion of the part resulting from production, as is described below in detail with reference to FIG. 3. In this process, material parameters, such as temperature expansion coefficients, stiffnesses, chemical shrinkage of the materials used, are taken into account. Corresponding correction factors can be obtained from the detection of real material distortions, which factors can also be incorporated into the mathematical description of the components in order to obtain a better adaptation to real conditions.

When selecting the cross-sectional areas of the components, portions which are relatively strongly curved are of particular interest, as these contribute greatly to the resulting distortion of the part.

A corresponding cross-section of the shell, that is to say a cross-section assigned to the stringer cross-section is now modelled based on the above-mentioned cross-sectional model, the material parameters of temperature expansion coefficients and stiffnesses of the materials used being used in turn.

Modelling the cross-sections with regard to temperature and load results in corresponding distortion angles and moments (in [Nm/m]) which correspond to the predicted distortion of the part.

Properties (change in length, orientation, distortion angle, etc.) of the part to be produced can be determined from the knowledge of the possible distortion of the components or of a combination of the components predetermined in this way, in such a way that sizing of the components can be taken into account accordingly for the actual production of the part, in order to produce a part having the desired properties, without arriving at the desired part by means of a laborious and costly trial and error method.

The method according to the various teachings of the present disclosure will now be described in greater detail with reference to FIG. 3.

Figure 3:
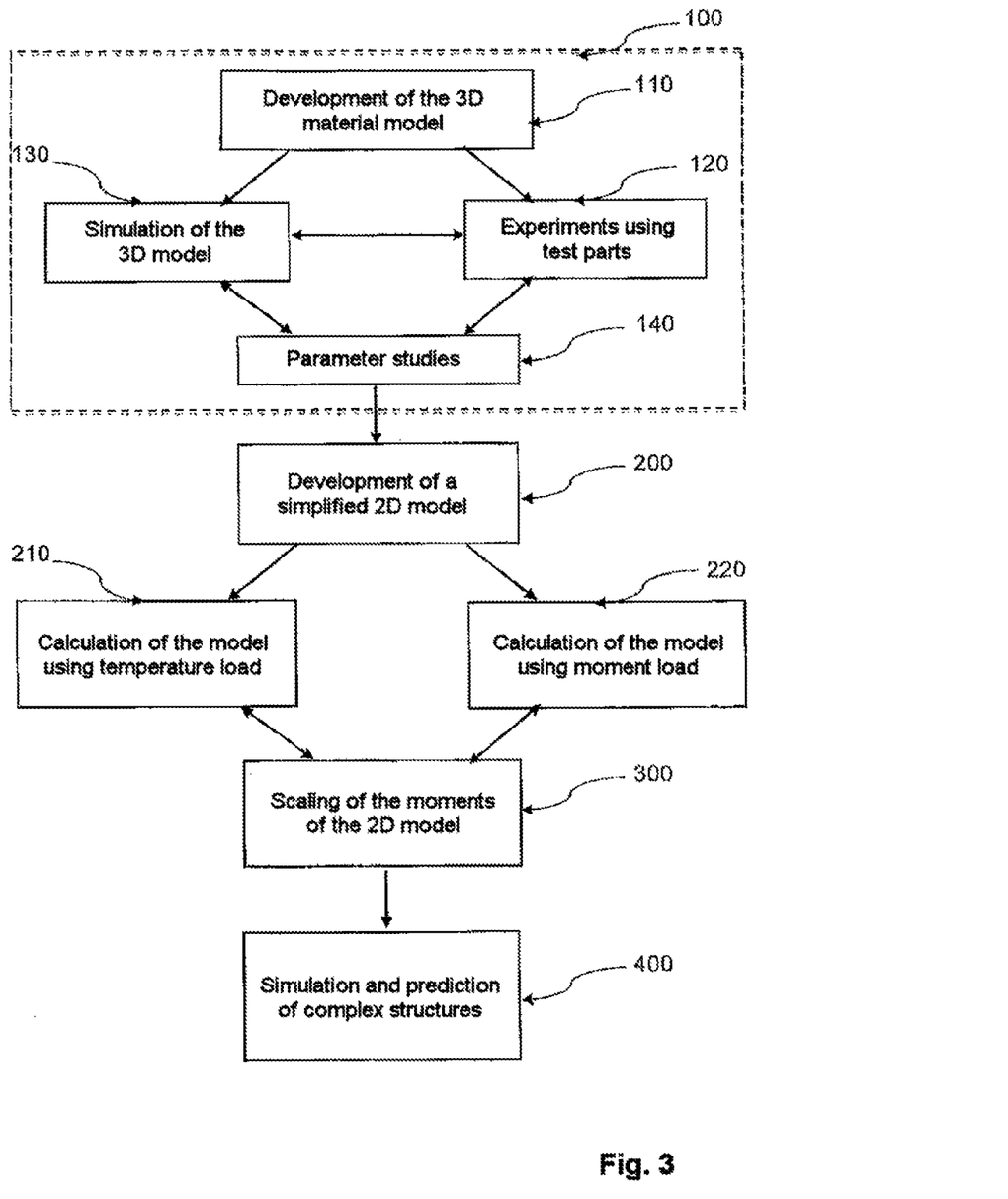
FIG. 3 is a flow diagram of an embodiment of the method according to the various teachings of the present disclosure.

FIG. 3 is a flow diagram of one exemplary embodiment of the method according to the various teachings of the present disclosure. The development from a material model up to the calculation of complex structures is described.

The method presented means that even distortions of large components can be simulated within an acceptable computing time and accuracy and the simulation can be adapted quickly by means of simplified modelling.

The known calculation methods for small parts can, as already mentioned above, very realistically reproduce the curing process using many parameters. In the case of large and/or complex parts however, these methods quickly reach the upper capacity limit of the available computing power.

The so-called "spring-in" effect of a T-shaped stinger 20 having two L-shaped profiles 21 and 22 thus mainly results from the contraction of the laminate in a direction which is outside the plane of the shell 15. Furthermore, contractions of the pure resin in a radius filler 23, 23, as shown in FIG. 1, can also lead to an effect of this type. This effect can only be calculated by simulations using three-dimensional (3D) elements. The effect can however also be detected by introducing moments into the two-dimensional (2D) shell model, which produce the same deformations.

On the other hand, so-called distortion effects, which result from the shrinkage in the direction of the plane of the shell 15, can be detected by calculation using 2D shell elements.

In the method according to the present disclosure, the cross-section of a stringer 20 is therefore initially modelled and simulated (100) in detail using 3D elements according to the known method in order to achieve the spring-in of the stringer 20. For example, a 3D material test piece can be developed (110) for this purpose, which is simulated (130) using a 3D model using suitable computer software (130). By means of experiments on the test piece (120) and parameter studies (140) the simulated 3D model is adapted to the 3D material test piece.

In the case of this 3D model, the spring-in mainly results from the thermal and chemical shrinkage of the model. It appears that the skin thickness, the skin lamination and the blade thickness are the parameters having the greatest influence on the spring-in. In this case, neither the skin thickness nor the lamination themselves produce a spring-in, but they do reduce the spring-in that can be caused by the stringers. Furthermore, the contraction of the blade is impeded by the skin. The resulting force produces a moment in the skin which produces the spring-in.

In addition, the L-profile lamination and the region of the radius filler have a great influence on the spring-in. In this case, the angle of the L-profile radius decreases during the cooling. The size of the angle difference depends in this case on the lamination of the L-profile. Furthermore, the contraction of the filler leads to a local deformation of the skin and thereby also causes an increase in the spring-in.

As an alternative to the linear approach, the spring-in can also be calculated using a technically more complex approach which incorporates nonlinear effects. The spring-in can also be measured directly using a stringer test piece.

In the case of the 3D model, the spring-in itself is deduced in each case from the deflection on the underside of the skin. The angle at the end of the stringer foot is determined from the results.

After the simulated 3D model has been optimised, the same cross-section is calculated (200) using the 2D shell model, for example as a 1 meter stringer having a skin, in a further step of the method according to the present disclosure. The structure to be examined is in this case divided into a grid structure during its simulation.

Since the deformation of the 2D model cannot describe the deformation of the detailed 3D model exactly, a method is chosen in which equivalent moments are used. As a result, the spring-in at the boundary of the stringer foot is equivalent in the two models. In order to achieve this, the 2D model of the same stringer is calculated for two load cases (210 and 220).

Load case 1 comprises a temperature of, for example, about −160° C. Load case 2 comprises a unit moment. The moments are assigned in pairs in opposing directions to grid points or nodes of the stringer foot, to the right and to the left of the blade. The moments are applied to the stringer foot as close as possible to the blade. For modelling using two rows of elements for the feet, the row of nodes in the centre of the stringer feet is the position directly adjacent to the blade.

The calculation of the 2D stringer model produces a value for the spring-in for each load case. Similarly to the detailed model, the spring-in is deduced from the deflection on the underside of the skin.

One spring-in value is therefore deduced from the temperature and a further spring-in value is deduced from the moments. The angles at the end of the stringer foot are again determined In this instance, the material parameters are the stiffnesses and temperature expansion coefficients from the data sheet of the test piece. The chemical shrinkage does not need to be taken into account in this instance since the calibration of the parameters for the parameter occurring in this instance, "temperature expansion in the direction transverse to the fibre", has now produced the simple value without addition.

The moment is then scaled in such a way that the sum of the angles of the L-profiles of temperature load case and moment load case corresponds to the angle of the L-profile from the calculation of the 3D cross-sectional model.

In order to obtain the angles of the detailed model, the moments must be scaled (300). An addition of the spring-in from the temperature load case and of the spring-in from the load case to the scaled moments leads to the desired spring-in values:

$$\gamma_{2D} = \gamma_{2D\_Temp} + X \cdot \gamma_{2D\_Moment} = \gamma_{3D}$$

$$X = (\gamma_{3D} - \gamma_{2D\_Temp})/\gamma_{2D\_Moment} \quad (1)$$

$\gamma_{2D}$ being the resulting spring-in of the 2D model and $\gamma_{2D\_Temp}$ being the spring-in of the 2D model with a temperature load. Furthermore, $\gamma_{2D\_Moment}$ is the spring-in of the 2D model at a moment of 1 Nmm/mm, $\gamma_{3D}$ is the spring-in of the detailed 3D model, and X is the scale factor of the moment (400).

The moment for the examined cross-section is given in [Nm/m]. The moments for all cross-sections must, however, be determined.

Large structures in particular comprise a plurality of stringer configurations having different skin and blade layers. Since it is difficult to explicitly calculate the moments for all existing stringer-skin-blade configurations, it is advantageous to establish a moment-thickness relationship. Since the stringers show interdependence between the spring-in and the blade thickness, the moment scale factors can be interpolated. Some skin and blade stacks are therefore chosen from the large structure which covers the range from the smallest to the greatest thickness in the model.

In other words, the existing L-profile is calculated for this purpose using the minimum skin thickness, the maximum skin thickness, and the skin thickness used most frequently in the model. These thicknesses are then calculated in turn using different blade thicknesses and for this the moments and the scale factors thereof are determined according to equation (1).

Figure 4:
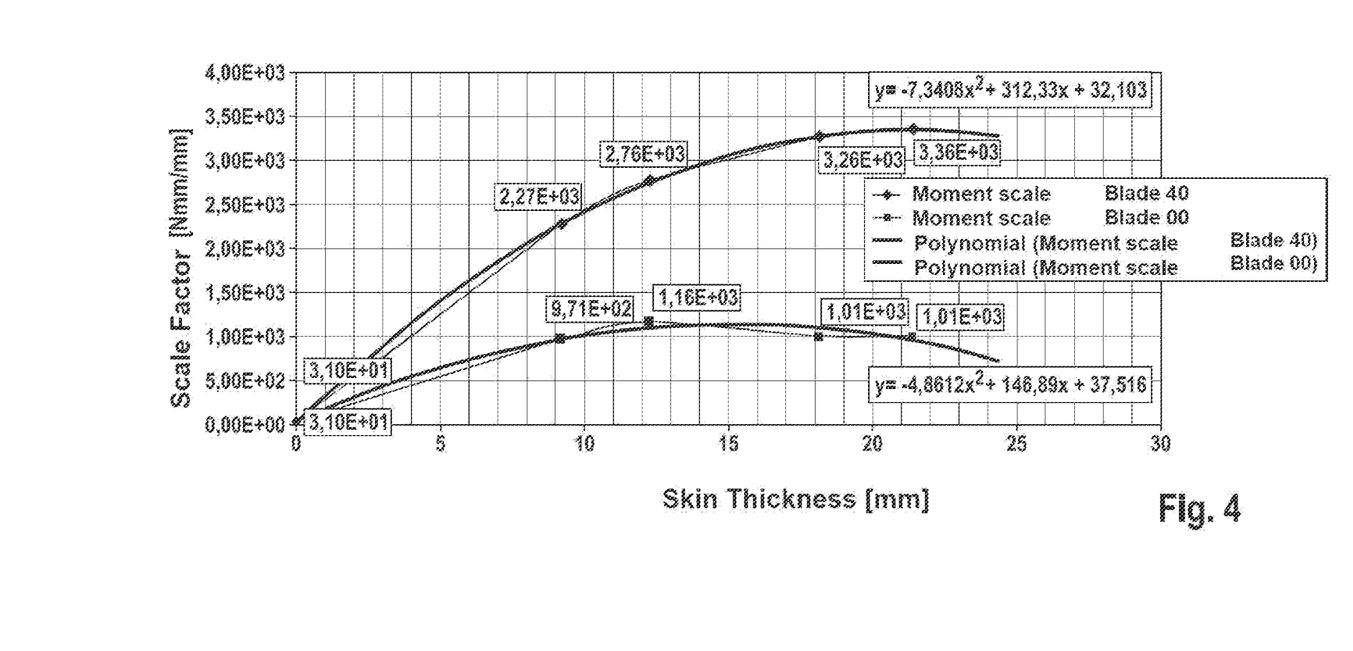
FIG. 4 is a diagram showing trend lines of different blade structures.

The results of the scale factors for the moments are plotted against the skin thickness (see FIG. 4). The moment scale factor and also the moment of any stringer cross-section in the model can be interpolated from the resulting trend line.

FIG. 4 shows two trend lines for different blade structures. In this case, the upper trend line shows the moment for a stringer having a blade comprising 40 layers as a function of the skin thickness. The lower trend line shows the moment for stringers without additional blade layers.

Figure 5:
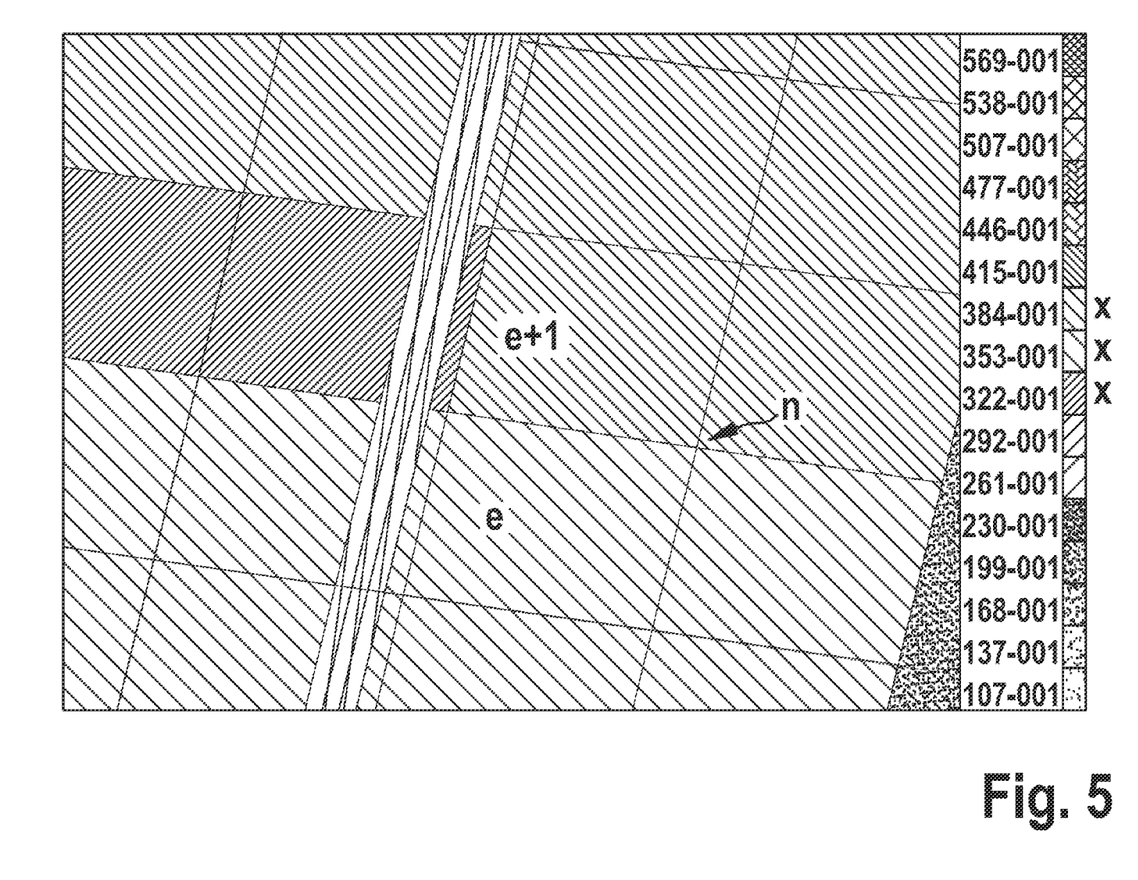
FIG. 5 is a schematic representation of nodes in a shell detail.

Using the trend line, the moments are applied to the respective nodes n (see FIG. 5). For this purpose, the respective skin thickness and the respective blade thickness are determined from the model for each node n of the elements e and e+1 adjacent to a blade, and the resulting moment scale factor is calculated on the basis of the trend line or derived from the interpolated trend line (see FIG. 4).

The moment is then calculated based on the half-length of the elements from node to node, the so-called length of influence, and the moment scale factor:

$$m_n^e = \frac{1}{2} l \cdot S_M \quad (2)$$

$m_n^e$ being the moment at the node n of the element e, l being the length of the element from one node to the next in the direction of the stringer and $S_M$ being the moment scale factor.

The moment $m_n^e$ at the node n of the element e and the moment $m_n^{e+1}$ the node n of the adjacent element e+1 in the direction of the stringer are added:

$$m_n = m_n^e + m_n^{e+1} \quad (3)$$

The mean of the moments is subsequently taken in such a way that the moments at the nodes on the right $m_n^{right}$ and left $m_n^{left}$ of the blade have the same value in pairs.

$$m_n^{mean} = \frac{1}{2} m_n^{left} + \frac{1}{2} m_n^{right} \quad (4)$$

Using the mean moment $m_n^{mean}$ and the temperature, the complex structure can be simulated. Gravitation and so-called linear gaps can optionally also be included therewith in order to calculate deformations which are comparable with the deformations of the real part measured in the production form. The stiffness and temperature expansion coefficient parameters from the data sheet of the test piece are once again applied as material parameters.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents. For example purposes only, the use of the teachings of the present disclosure in other fields, in particular in aircraft construction or shipbuilding, is also conceivable.

What is claimed is:

1. A method for producing a part for an aircraft or spacecraft, comprising:
   carrying out a computer-aided simulation for a plurality of cross-sections of the part based on a 3D cross-sectional model to obtain a first result which represents shrinkage of the part basically caused by at least one of a thermal and chemical reaction;
   carrying out a second computer-aided simulation for the plurality of cross-sections of the part based on a 2D shell model to obtain a second result, which represents shrinkage of the part caused by at least one of a thermal and chemical reaction, wherein the carrying out the second computer-aided simulation for the plurality of cross-sections of the part based on the 2D shell model is carried out for at least a predetermined unit moment which acts on the part, wherein the carrying out the second computer-aided simulation for the plurality of cross-sections of the part based on the 2D shell model is carried out for a predetermined temperature of the part;
   determining a scale factor for the second result in such a way that the second result corresponds to the first result, wherein the determining the scale factor is carried out based on a sum of the second result at a predetermined temperature of the part and the second result at at least the predetermined unit moment which acts on the part;
   determining scale factors for any cross-sections which are between two adjacent cross-sections from the plurality of cross-sections, by means of interpolation;
   predicting a distortion of the part; and
   producing the part based on the predicted distortion of the part.

2. A method for producing a part for an aircraft or spacecraft, comprising:
   carrying out a computer-aided simulation for a plurality of cross-sections of the part based on a 3D cross-sectional model to obtain a first result which represents shrinkage of the part basically caused by at least one of a thermal and a chemical reaction;
   carrying out a second computer-aided simulation for the plurality of cross-sections of the part based on a 2D shell model to obtain a second result at a predetermined temperature of the part, which represents shrinkage of the part caused by at least one of a thermal and a chemical reaction, wherein the carrying out the second computer-aided simulation for the plurality of cross-sections of the part based on the 2D shell model is carried out for at least a predetermined unit moment which acts on the part;
   determining a scale factor for the second result in such a way that the second result corresponds to the first result, wherein the determining the scale factor is carried out based on a sum of the second result at a predetermined temperature of the part and the second result for at least the predetermined unit moment which acts on the part;
   determining scale factors for any cross-sections which are between two adjacent cross-sections from the plurality of cross-sections, by means of interpolation;
   predicting a distortion of the part; and
   producing the part based on the predicted distortion of the part.

* * * * *